Patented Oct. 13, 1931

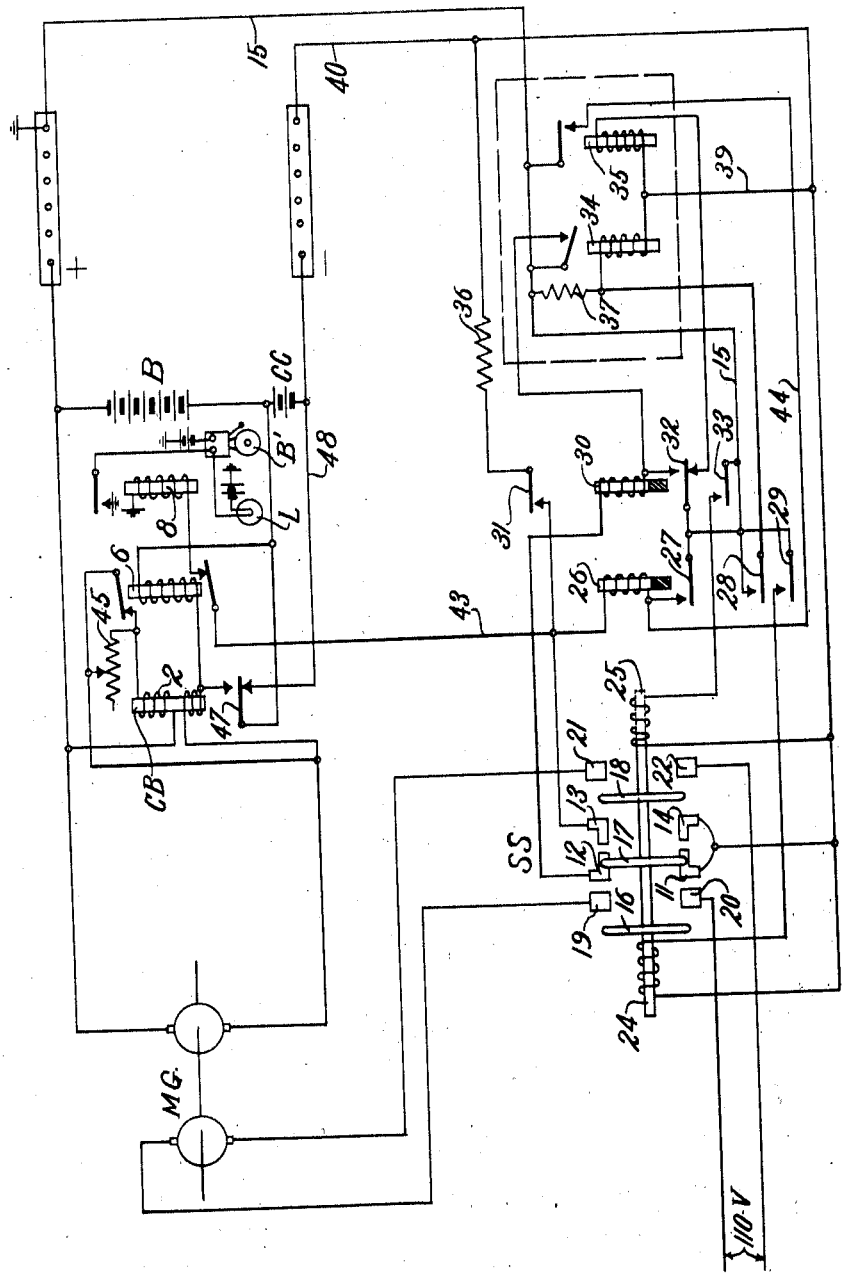

1,827,090

UNITED STATES PATENT OFFICE

CLARENCE E. LOMAX, OF OAK PARK, ILLINOIS, ASSIGNOR TO AUTOMATIC ELECTRIC INC., OF CHICAGO, ILLINOIS, A CORPORATION OF DELAWARE

VOLTAGE CONTROL EQUIPMENT

Application filed December 11, 1925. Serial No. 74,675.

The present invention relates in general to voltage control equipment used in connection with battery charging and regulating systems.

In certain types of battery charging systems it has been customary practice to use a circuit breaker operated by the charging current for connecting the battery to be charged to the generator at the proper time and to cut in counter cells in series with the battery during charging, so that the output circuit of the battery is maintained within desired limits during the charging operation. The circuit breaker used is designed to restore under influence of the battery when the charging operation is stopped to disconnect itself from the battery and shunt out the counter cells.

It has been found that it is necessary, in order to meet all conditions occurring in practice, to provide motor generating equipment of widely varying charging rates. Considerable trouble has been encountered, however, owing to the fact that where the motor generator used is of small capacity the circuit breaker fails to restore when charging ceases due to the fact that the generator will operate as a motor on a smaller amount of current than is required for restoring the circuit breaker.

An object of the invention, therefore, is to provide means for inserting an appropriate resistance unit in series with the operating winding of the circuit breaker after the same has been operated so that when charging ceases only a slight reverse current flow through the series winding will be required to cause the circuit breaker to restore.

A further feature of the invention incorporated in the above arrangement causes an alarm to be given should any of the charging equipment fail to function when the battery potential falls sufficiently to cause the low voltage relay to restore.

The invention is disclosed in a single sheet of drawing which shows the circuit breaker and the associated charging equipment diagrammatically.

In order to bring out the various features of the invention, it is believed advisable to explain the various operations which take place under the varying conditions encountered. For this purpose it is first assumed that the battery B is of normal operating voltage. At this time relays 6 and 34 are in operated position. The relay 6 receives current over a circuit extending from the negative pole of battery B, winding of relay 6, series winding of the circuit breaker CB, upper armature and working contact of relay 6, and resistance unit 45 in multiple, operating winding 2 of the circuit breaker CB to the positive side of battery. The low relay 34 is held operated from battery supplied by the negative bus bar over a circuit extending by way of conductors 40, 39, and the winding of relay 34, resistance unit 37 to conductor 15 connected to the positive bus bar. The initial energizing circuit of this relay will be traced later.

It is now assumed that the battery voltage has dropped below a certain point causing the relay 34 to restore to normal with the following result: A circuit is completed for slow release control relay 30 by way of positive conductor 15, armature of relay 34 and its resting contact, winding of control relay 30, contact 12, wiper 17, and contact 11 of the solenoid switch SS, negative conductor 40. Control relay 30, upon energizing, completes a locking circuit for itself at its armature 32 over a circuit which excludes the circuit closed by the deenergization of relay 34, and at its armature 33 connects the winding 25 of the solenoid switch, or electro-responsive connecting switch, SS in bridge of the conductors 15 and 40, extending to the battery bus bars. The control relay 30 also at its armature 31 completes an operating circuit for relay 8, but in normal operation, i. e., when all equipment is functioning properly, this relay is rendered ineffective by the restoration of relay 6.

The solenoid connecting switch, upon operating, shifts its wipers 16, 17, and 18 to the right, by means of wipers 16 and 18 connecting the motor of the motor generator set to the commercial current supply. By shifting the wiper 17 the connecting switch SS opens the circuit of control relay 30 and prepares an operating circuit for control relay 26. The relay 30, upon restoring, opens the circuit of winding 25 at armature 33. The solenoid connecting switch wipers, however, remain in the position to which they have been moved until returned by energizing winding 24.

Since the commercial current has been connected with the motor of the motor generator MG, the charging operation commences. On the generator side of the motor generator, the voltage rises as the machine speeds up, and when it has reached the desired point, which is higher than the voltage of the battery B, a sufficient amount of current flows through the shunt winding of the marginally adjusted circuit breaker CB, to operate the said circuit breaker. The circuit breaker CB, in operating its armature, removes the shunt from around the counter cells CC, places a shunt about the winding of relay 6 and completes the circuit for charging the battery B. The generator is so adjusted that the voltage rises considerably higher than normal when the circuit breaker CB is open. This sends a fairly high current through the shunt winding of the circuit breaker and allows the latter to pick up. After the circuit breaker has operated, the potential across the terminals of the generator is reduced to practically the potential across the terminals of the battery B. The shunt winding alone of the circuit breaker is not able to hold the circuit breaker in its operated position at this potential, and the circuit breaker is held in only by the combined energization of the shunt and the series winding. Since the winding of relay 6 is now short circuited this relay restores, at its lower armature opening the circuit of alarm relay 8 to prevent its operation as a result of the wiper 17 having connected negative potential to it, and at its upper armature removes the shunt from about the resistance unit 45.

When the voltage across the bus bars reaches the high limit the high voltage relay 35 will operate to complete the previously prepared circuit for control relay 26. This circuit may be traced from the negative bus bar, conductor 40, contact 14, wiper 17, and contact 13 of the solenoid switch, winding of relay 26, conductor 44, working contact and armature of relay 35, conductor 15 and to the positive bus bar. Relay 26 upon operating, at armature 27 completes a locking circuit for itself independent of that closed by relay 35, at its armature 28 shunts out the resistance unit 37 connected in series with low relay 34 so that this relay can again restore as soon as the battery voltage reaches normal, and at armature 29 and its working contact completes a circuit for winding 24 of the solenoid connecting switch. This circuit extends from the negative conductor 40, winding 24, front contact and armature 29 to the positive conductor 15. The energization of winding 24 causes the wipers 16, 17, and 18 to be shifted back to the position shown in the drawing, thereby disconnecting the commercial current from the motor generator MG. When the current flow through the series winding of the circuit breaker CB falls to zero, or thereabout, the armature of the circuit breaker is released owing to the fact that the circuit breaker cannot be maintained energized by the shunt winding 2 alone at the voltage of the battery B. Since at this time the resistance unit 45 is connected in series with the operating winding 2 of the circuit breaker, even if the battery B starts operating the generator as a motor sufficient current will still not be able to pass through the operating winding to maintain the circuit breaker operated and the same will restore. The battery B is now disconnected from the motor generator MG, and the motor generator MG remains at rest until it is started again when the wipers 16 and 18 are again shifted to the charging position by the winding 25 of the solenoid switch.

We will now assume that when the voltage dropped below normal and the relay 34 operated by deenergizing to start the charging operation that the solenoid connecting switch SS failed to operate. This results in a circuit being completed, from ground, winding of relay 8, lower working contact and armature of relay 6, conductor 43, working contact and armature 31, resistance unit 36, conductor 40 to grounded battery. Relay 8 operates over the above circuit to cause the lamp L and buzzer B' to give an alarm.

If the solenoid connecting switch does operate and the motor generator fails to generate sufficient current to operate the circuit breaker, the relay 6 will also remain operated to cause an alarm. In this case, however, relay 8 receives negative battery via contact 13, wiper 17 and contact 14 of the solenoid switch.

If, responsive to the restoration of relay 34, the charging operation takes place in the manner originally described, the relay 6 will be shorted out as described and no alarm will be given.

It will be noted that the resistance unit 45 is shown as being variable so that adjustment can be made to meet the requirement regardless of the capacity of the motor generator used, although if more desirable, a fixed resistance unit may be provided.

From the foregoing it will be appreciated that applicant has devised a scheme which is highly desirable for use in connection with circuit breakers wherein the charging equipment to be used with them may vary considerably, together with a suitable alarm which is effective when either the motor generator fails to start when properly connected or when the circuit breaker fails to operate when the motor generator is connected up for operation.

What is claimed is:

1. In combination, a relay, a source of current comprising a storage battery, a circuit connecting said source to the said relay to energize said relay, a circuit breaker having an operating winding and a series winding, a motor generator set, a circuit connecting the generator to the operating winding of the circuit breaker to energize the same when the generator voltage is above a certain value, circuit conections completed by the energization of said circuit breaker for connecting the generator through the series winding to said battery and for placing a short circuit around said relay to deenergize it, and circuit connections controlled by the deenergization of said relay for including a resistance element in series with the operating winding of said circuit breaker so that when the current from the generator through said series winding falls below a certain value the circuit breaker is deenergized.

2. In a battery charging system, a relay, a circuit breaker having an operating winding and a series winding, a source of current comprising a storage battery, a circuit connecting said source to said relay to energize said relay, a resistance unit in series with said operating winding, a shunt circuit about said unit completed by said relay while energized, a motor-generator set, a circuit connecting the generator to the operating winding of the circuit breaker to energize the same when the generator voltage is above a certain value, and circuit connections completed by the energization of the circuit breaker for connecting the generator through said series winding to the battery and for shunting said relay to deenergize it to thereby open the shunt about said resistance unit for deenergizing said circuit breaker when current from the generator through said series winding falls below a certain value.

3. In a battery charging system, a circuit breaker having an operating winding, a motor-generator set, an operating circuit for the motor thereof, an electro-responsive connecting switch, a relay having contacts biased to the closed position, a storage battery, circuit means to supply said relay with current from said battery to energize the same to hold said contacts open as long as the potential of said battery remains above a certain value, circuit means for operating said connecting switch upon the closure of said relay contacts when the battery potential drops below said certain value, means operated by said switch for completing the operating circuit for the motor of said set, circuit means including said operating winding for operating said circuit breaker by current from the generator of said set, circuit connections completed by said circuit breaker when operated for connecting said generator to said battery to charge said battery, an alarm signal, and means operated if said connecting switch, said motor-generator set or said circuit breaker fails to operate following the closure of said contacts for actuating said alarm signal.

4. In a battery charging system, a storage battery, a control relay, means operated when the potential of said battery falls below a predetermined value for energizing said control relay, an electro-responsive switching device, a motor-generator set, circuit connections completed by said control relay when energized for operating said switching device, circuit connections completed by said switching device for starting the operation of said motor-generator set, a circuit breaker having an operating winding, circuit means including said operating winding for operating said circuit breaker from current produced by the generator, circuit connections completed by said circuit breaker when operated for completing the charging circuit between the generator and said battery, an alarm signal, an alarm relay, circuit connections completed by said alarm relay for operating said signal, and a circuit for said alarm relay completed by said control relay when energized for operating said alarm relay, said switching device upon operating preventing said alarm relay operating.

5. In a battery charging system, a storage battery, a control relay, means operated when the potential of said battery falls below a predetermined value for energizing said control relay, an electro-responsive switching device, a motor-generator set, circuit connections completed by said relay when energized for operating said switching device, circuit connections completed by said switching device for starting the operation of said motor-generator set, a circuit breaker having an operating winding, circuit means including said operating winding for operating said circuit breaker from current produced by the generator of said set, a charging circuit between the generator of said set and said battery completed by said circuit breaker when operated, an alarm signal, an alarm relay, circuit connections completed by said alarm relay for operating said signal, a first circuit for said alarm relay completed by said control relay when energized for operating said alarm relay, said switching device opening said first circuit upon operating, and a second circuit for said alarm relay completed by said switching device when operated for operating said alarm relay, said circuit breaker, upon operating on current from said generator, causing the opening of said second circuit to prevent the operation of the alarm relay.

6. In a battery charging system, a storage battery, a control relay, means operated when the potential of said battery falls below a predetermined value for energizing said control relay, an electro-responsive switching device, a motor-generator set, circuit connections completed by said control relay when energized for operating said switching device, circuit connections completed by said switching device for starting the operation of said motor-generator set, a circuit breaker having an operating winding, circuit means including said operating winding for operating said circuit breaker from current produced by the generator of said set, a charging circuit between the generator of said set and said battery completed by said circuit breaker when operated, an alarm signal, an alarm relay, circuit connections completed by said alarm relay for operating said signal, a first circuit for said alarm relay completed by said control relay when energized for operating said alarm relay, said switching device, upon operating, opening said first circuit, a second circuit for said alarm relay completed by said switching device when operated for operating said alarm relay, and intermediate means responsive to the operation of said circuit breaker on current from the generator of said motor-generator set for opening said first and second circuits to prevent the operation of said alarm relay.

In witness whereof, I hereunto subscribe my name this 9th day of December, A. D. 1925.

CLARENCE E. LOMAX.